United States Patent [19]

Gagliardi, Jr.

[11] Patent Number: 5,286,229
[45] Date of Patent: Feb. 15, 1994

[54] METHOD OF MAKING A FOOD PRODUCT FROM THE WING OF A BIRD AND FOOD PRODUCT MADE IN ACCORDANCE WITH THE METHOD

[75] Inventor: Eugene D. Gagliardi, Jr., West Chester, Pa.

[73] Assignee: Designer Foods, Inc., Chadds Ford, Pa.

[21] Appl. No.: 989,399

[22] Filed: Dec. 11, 1992

[51] Int. Cl.[5] .............................................. A22C 21/00
[52] U.S. Cl. .................................................... 452/169
[58] Field of Search .................. 452/169, 198, 135; 426/518, 644

[56] References Cited

U.S. PATENT DOCUMENTS 5,080,631  1/1992  Howard et al. ..................... 452/169

FOREIGN PATENT DOCUMENTS 2566629  1/1986  France .

Primary Examiner—Willis Little
Attorney, Agent, or Firm—Panitch Schwarze Jacobs & Nadel

[57] ABSTRACT

A method of making a food product from the wing of a bird comprising a middle section, a tip section and an end section involves cutting through a first joint to separate and remove the tip section. Skin extending between the middle section and the end section is cut along a cutline extending therebetween. The end section is also nicked on a side opposite to the side on which the skin has been cut. A cut is made through the area between the bones of the middle section to separate the middle section into two portions. The end section is bent with respect to the middle section about the joint therebetween so that the middle section and end section are generally aligned end to end with each other with the common joint therebetween. Finally, the two portions of the middle section are spread apart to provide a food product having the appearance of a cowboy wearing chaps.

4 Claims, 1 Drawing Sheet

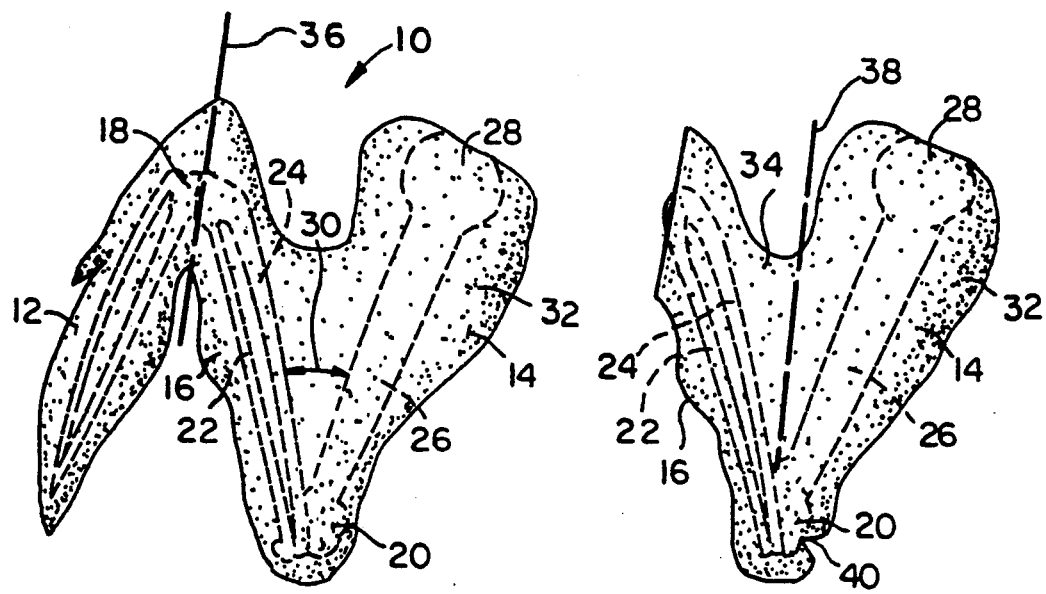
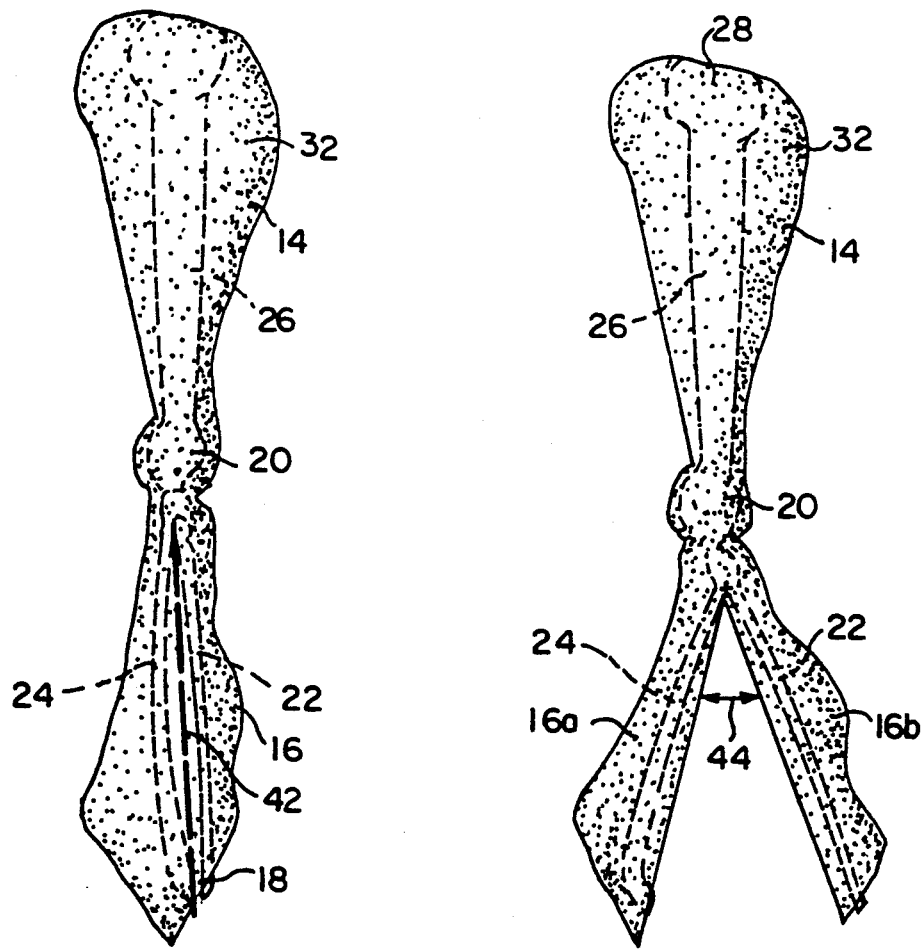

METHOD OF MAKING A FOOD PRODUCT FROM THE WING OF A BIRD AND FOOD PRODUCT MADE IN ACCORDANCE WITH THE METHOD

BACKGROUND OF THE INVENTION

The present invention relates generally to a method of making a food product from the wing of a bird as well as a food product produced thereby, and more particularly, to a food product comprising two sections of a bird wing arranged in an interesting manner.

Birds, such as poultry and fowl, are conventionally eviscerated, dressed, and sold either as a whole bird or as severed parts, i.e., breast, thighs, wings, etc. One of the parts which is sometimes separated and sold is the bird wing, which comprises a middle section, a tip section attached to one end of the middle section, and an end section attached to the other end of the middle section. FIG. 1 shows a typical bird wing 10 having a tip section 12, an end section 14, and a middle section 16. As is well known, bird wings are not as commercially valuable as other parts of birds, such as breasts, thighs, and legs, due to the relatively small amount of meat present in the wing, the size and centralized location of the bones and joints, and the high percentage of skin, bone and joints to meat.

In recent years, there has been an increasing demand for innovative meat products, particularly meat products which require less time for preparation and which include little or no waste. There has also been an increasing demand for meat products which are boneless or relatively boneless, making such products easier to consume. Hence, products such as boneless chicken breasts, chicken tenders, etc., have enjoyed tremendous commercial success and have obtained enhanced popularity for the respective cuts from which they are prepared.

Until recently, bird wings have not been particularly amenable to such enhanced commercial processing and/or preparation methods for a variety of reasons primarily related to the relatively small amount of meat, the size and centralized location of the bones, etc. More recently, products such as "hot wings" have led to increased popularity of bird wings as an appetizer, snack food, etc.

The present invention comprises a method of cutting a bird wing into a unique food product having an interesting appearance. More particularly, the food product has the appearance of a stick figure cowboy having a pair of chaps on his legs. A food product made in accordance with the present invention should be helpful in spurring interest in the purchase, preparation and consumption of bird wings, particularly by young people.

SUMMARY OF THE INVENTION

Briefly stated, the present invention comprises a method of making a food product from the wing of a bird having a middle section, a tip section and an end section. The middle section includes a first joint, a second joint, two bones spaced apart and generally parallel to each other and extending between and being connected to the first and second joints and meat attached to the bones. The tip section is connected to the first joint and the end section is connected to the second joint. The end section extends from the second joint at an angle of less then 180 degrees with respect to the middle section, the end section having a single bone and meat attached to the bone. The wing further comprises a web of skin extending between the middle section and the end section. The steps of the method comprise cutting through the first joint to separate and remove the tip section from the remainder of the wing. The skin extending between the middle section and the end section is cut along a cut line extending between the first and second joints. The end section is cut to nick the second joint on a side opposite to the side on which the skin between the middle section and end section is located. The first joint is cut along a cut line extending generally parallel to and between the two middle section bones and extending to the second joint to separate the two middle section bones at least at one end approximate the first joint. The end section is bent with respect to the middle section about the second joint so that the middle section and end section are generally aligned end to end with the second joint therebetween. The two bones of the middle section are spread apart on the one end to form a food product having the general appearance of a cowboy wearing chaps.

BRIEF DESCRIPTION OF THE DRAWINGS

The foregoing summary, as well as the following detailed description, will be better understood when read in conjunction with the appended drawings. For the purpose of illustrating the invention, an embodiment which is presently preferred is shown in the drawings. It is understood, however, that this invention is not limited to the precise arrangements and instrumentalities shown. In the drawings:

FIG. 1 is an elevation view of a bird wing as it would appear when initially removed from a bird carcass;

FIG. 2 is an elevation view of the bird wing of FIG. 1 with the tip portion removed;

FIG. 3 is an elevation view of the bird wing of FIG. 2 with the skin between the middle and end sections cut and with the middle and end sections reoriented to be generally aligned end to end; and FIG. 4 is an elevation view of the bird wing of FIG. 3 with the distal ends of the middle section legs separated.

DETAILED DESCRIPTION OF THE PREFERRED EMBODIMENT

Referring in detail to the drawings, wherein like numerals indicate like elements throughout, there is shown in FIG. 1 an elevation view of a bird wing 10 which has been separated from the carcass of a bird (not shown). The bird wing 10 illustrated in FIG. 1 can be from any type of fowl or poultry carcass and, therefore, the present method is equally applicable to wings obtained from all types of fowl or poultry carcasses including duck, turkey, squab, chicken, etc., both wild and domesticated. For purposes of illustrating the present invention, the bird wing 10 in the present embodiment is a chicken wing.

The chicken wing 10 includes a tip section 12, an end section 14, and a middle section 16 extending between the tip section 12 and the end section 14. The tip section 12 and the middle section 16 are connected together at a common first knuckle or joint 18 in a manner well known to those skilled in the art. The end section 14 and the middle section 16 are correspondingly connected together at a common second knuckle or joint 20 on an end of the middle section 16 which is opposite to the end on which the first joint 18 is located.

The middle section includes two generally elongated bones 22 and 24 which are spaced apart and generally parallel to each other. Each of the bones 22 and 24 extends between the first joint 18 and the second joint 20 in a manner which is well known in the art. Similarly, the end section 14 includes a single, generally elongated bone 26 which extends from the second joint 18 to a third joint 28. The third joint 28 is the joint formed between the wing 10 and the remainder of the chicken (not shown) and is the joint which generally is cut through for removing the wing 10 from the chicken.

As is well known in the art, wing meat surrounds and is generally attached to the middle section bones 22 and 24 and the end section bone 26. As best shown in FIG. 1, the middle section 16 and the end section 14 extend outwardly from the second joint 20 at an angle, indicated by arc 30, which is generally less than 180° and, in the illustrated wing 10 is approximately 45°. It will be appreciated by those skilled in that art that the angle 30 between the middle section and the end section will vary from wing to wing and, therefore, should not be viewed as a limitation on the present invention.

A wing 10 of the type illustrated in FIG. 1 generally includes an outer layer of skin 32 which covers the bones 22, 24 and 26, the meat, the joints 18, 20 and 28, etc. A generally arcuate web of skin 34 also extends across the area between the middle section 16 and the end section 14.

The foregoing description relates to the features of a typical bird wing or chicken wing 10. It will be appreciated by those skilled in the art that the size, configuration, amount of meat, thickness and location of the skin, size of the joints, angle between the middle section and the end section, as well as various other features and attributes of the wing 10 may vary from wing to wing and are not intended to be a limitation on the present invention as described below. As indicated above, the present invention is equally applicable to all types of bird wings having virtually any configuration, size, etc.

The present invention relates to a method of making a food product from a wing 10. The method involves cutting the bird wing along a first cutline 36 to separate the middle section 16 from the tip section 12. More specifically, the first cutline 36 extends generally through the first joint 18 at an angle with respect to the middle section 16 which is generally one half of the angle between the middle section and the tip section 12. The first cut may be made utilizing any type of device or apparatus including a knife, reciprocal or band saw, rotating blade, water knife or any other suitable apparatus known to those skilled in the art. The severed tip section 12 is removed from the remainder of the wing 10 and is either used for some other purpose (not shown) or is destroyed.

The remaining portion of the wing, best shown in FIG. 2, is cut along a second cutline 38 extending through the web of skin 34 positioned between the middle section and the end section 14. The second cutline 38 extends at an angle with respect to the middle section 16 and the end section 14 which is approximately one half of the angle 30 between the two sections. Preferably, the second cut extends from the periphery of the web of skin 34 to the second joint 20 as illustrated in FIG. 2. As with the first cut, the second cut may be made utilizing a knife, reciprocal or band saw, rotating blade, water knife, or any other implement or apparatus known to those skilled in the art.

A third, relatively small cut is made through the end section 14 and through a portion of the second joint 20 on a side opposite to the side on which the web of skin 34 is located. The third cut is illustrated by notch 40 and may be made utilizing a knife, reciprocal or band saw, rotating blade, water knife, or any other such implement or apparatus. The purpose of the second and third cuts is to permit the relative movement of the middle section 16 with respect to the end section 14 about the second joint 20. More specifically, the second and third cuts permit the end section 14 and the middle section 16 to be bent and repositioned so that the middle section 16 and the end section 14 are generally aligned end to end with the bones 22, 24 and 26 generally along or generally parallel to a common axis as illustrated in FIG. 3 with the second joint 20 positioned therebetween.

A fourth cut is made to the wing 10 along a fourth cutline extending generally parallel to and between the two middle section bones 22 and 24. More specifically, the fourth cut is along a fourth cutline 42 which extends through the remaining portion of the first joint 18, through the area between the two middle section bones 22 and 24 and terminates proximate the second joint 20. In some embodiments of the invention, the fourth cut may also extend at least slightly into the second joint 20. Again, the fourth cut may be made utilizing a knife, reciprocal or band saw, rotating blade, water knife or any other implement or apparatus known to those skilled in the art.

The final step in making a food product in accordance with the present invention is to spread apart the two bones 22 and 24 of the middle section 16 at the end proximate the first joint 18 to form an angle 44 therebetween and to form separate middle section portions 16a and 16b. In the present embodiment, the angle 44, as illustrated in FIG. 4, is approximately 45° although it will be appreciated by those skilled in the art that any desired angle of from a few degrees up to 180° may be established depending upon the distance the two portions 16a and 16b of the middle section 16 are separated. The resulting food product shown in FIG. 4 has the general appearance of a cowboy wearing chaps. The food product may be cooked or otherwise prepared in any suitable manner know to those skilled in the art. One way of preparing the food product is to season the food product in a sauce, such as a "hot wings" sauce during or subsequent to cooking and to serve the food product with the sauce thereon. The food product provides a pleasing appearance on a serving dish and may be conveniently grasped for eating as "finger food", if desired.

From the foregoing description, it can be seen that the present invention comprises a new and useful method of making a food product from the wing of a bird as well as the food product made in accordance with the method. The present method is relatively quick, easy and reproducible to employ in connection with the preparation of bird wings and the resulting food product represents a more desirable and aesthetically pleasing than was available with the prior art. It will be recognized by those skilled in the art that changes could be made to the above-described embodiment of the invention without departing from the broad inventive concepts thereof. For example, the order in which the cuts are made may be altered. It is understood, therefore, that this invention is not limited to the particular embodiment disclosed above, but is intended to cover all modifications which are within the spirit and scope of the invention as defined by the appended claims.

I claim:

1. A method of making a food product from a wing of a bird, the wing comprising a middle section having a first joint, a second joint, two bones spaced apart and generally parallel to each other and extending between and being connected to the first and second joints, and meat attached to each of the bones, a tip section connected to the first joint, and an end section connected to the second joint, the end section extending from the second joint at an angle of less than 180° with respect to the middle section, the end section having a bone and meat attached to the bone, the wing further comprising a web of skin extending between the middle section and the end section, the method comprising the steps of:

(a) cutting through the first joint to separate and remove the tip section from the remainder of the wing;
   (b) cutting through the skin extending between the middle section and the end section along a cut line extending between the first and second joints;
   (c) cutting through the end section to nick the second joint on a side opposite to the side on which the skin between the middle section and the end section is located;
   (d) cutting through the first joint along a cut line extending generally parallel to and between the two middle section bones and extending to the second joint to separate the two middle section bones at least at one end proximate the first joint;
   (e) bending the end section with respect to the middle section about the second joint so that the middle section and the end section are generally aligned end to end with the second joint therebetween; and
   (f) spreading apart the two bones of the middle section on the one end whereby the food product has the general appearance of a cowboy wearing chaps.

2. The method as recited in claim 1 further comprising the step of seasoning the food product with a sauce.

3. The method as recited in claim 1 wherein step (a) is performed before any of the other steps.

4. A food product made in accordance with the method of claim 1.

* * * * *